(12) United States Patent
Carre et al.

(10) Patent No.: US 7,618,149 B2
(45) Date of Patent: Nov. 17, 2009

(54) BIMORPH MIRROR WITH TWO PIEZOELECTRIC LAYERS SEPARATED BY A CENTRAL CORE OF SEMIRIGID MATERIAL

(75) Inventors: Jean-François Carre, Pertuis (FR); Jean Jacques Ferme, Velaux (FR)

(73) Assignee: Societe Europeenne de Systemes Optiques (FR)

( * ) Notice: Subject to any disclaimer, the term of this patent is extended or adjusted under 35 U.S.C. 154(b) by 3 days.

(21) Appl. No.: 10/597,697

(22) PCT Filed: Jan. 13, 2005

(86) PCT No.: PCT/FR2005/000075

§ 371 (c)(1),
(2), (4) Date: Jun. 15, 2007

(87) PCT Pub. No.: WO2005/085931

PCT Pub. Date: Sep. 15, 2005

(65) Prior Publication Data

US 2007/0279775 A1 Dec. 6, 2007

(30) Foreign Application Priority Data

Feb. 6, 2004 (FR) .................................. 04 01194

(51) Int. Cl.
*G02B 5/08* (2006.01)

(52) U.S. Cl. ..................................................... 359/846
(58) Field of Classification Search ................. 359/224, 359/290, 291, 838, 846, 847
See application file for complete search history.

(56) References Cited

U.S. PATENT DOCUMENTS

| 4,257,686 A * | 3/1981 | Albertinetti et al. ......... 359/295 |
| 4,298,247 A | 11/1981 | Michelet et al. |
| 6,874,897 B2 * | 4/2005 | Graves et al. ............... 359/846 |
| 2003/0107828 A1 | 6/2003 | Northcott et al. |

FOREIGN PATENT DOCUMENTS

GB  2 238 880 A  6/1991

\* cited by examiner

*Primary Examiner*—Euncha P Cherry
(74) *Attorney, Agent, or Firm*—Alston & Bird LLP

(57) ABSTRACT

The invention relates to a bimorph mirror presenting first and second layers (1, 2) of piezoelectric ceramic together with at least one electrode enabling at least one curvature of the mirror to be varied as a function of at least one electrical voltage applied to the piezoelectric ceramics. The mirror of the invention is characterized in that the first and second layers (1, 2) are separated by a central core (5) of material such as glass or silica, forming a semirigid beam.

10 Claims, 2 Drawing Sheets

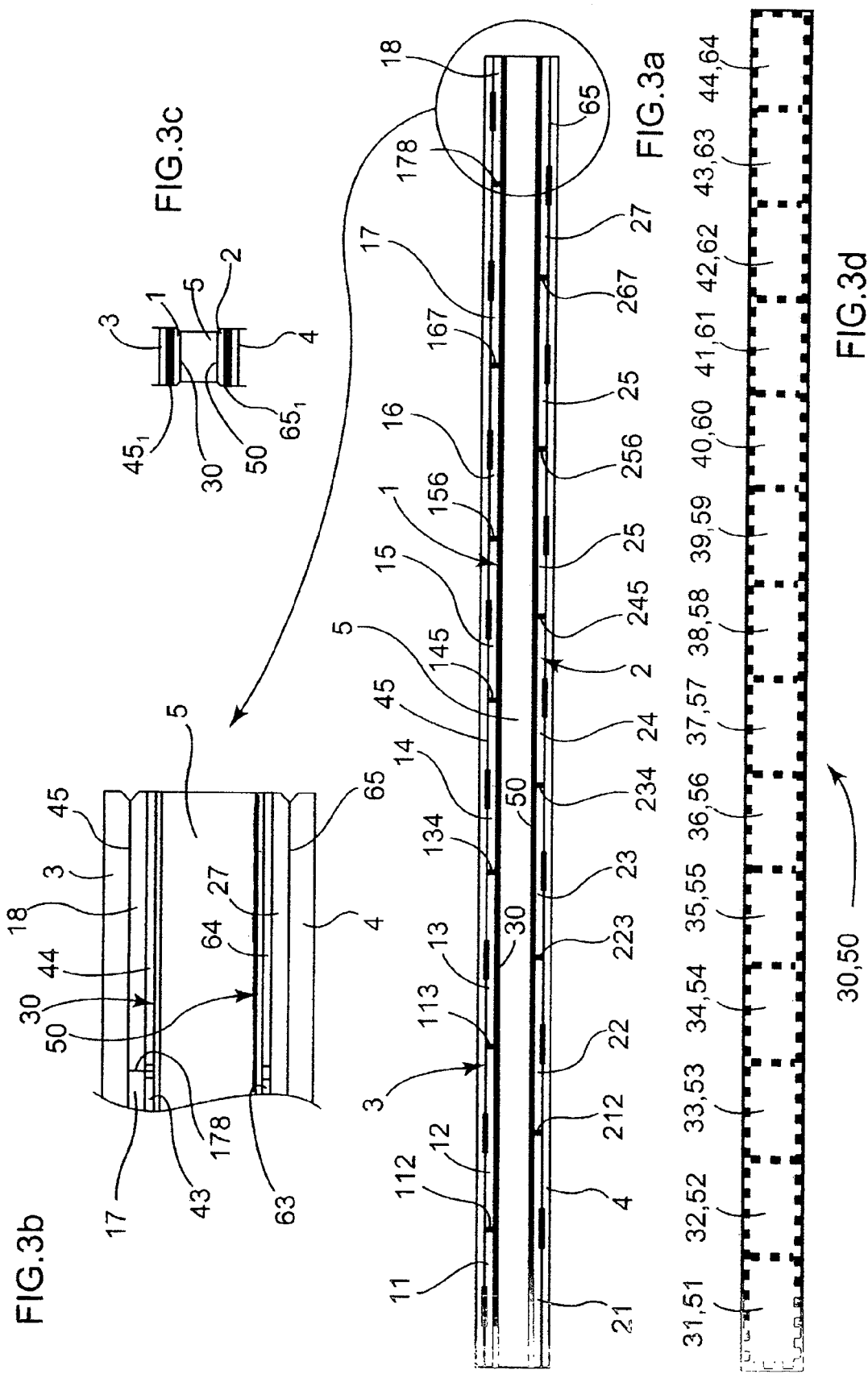

BIMORPH MIRROR WITH TWO PIEZOELECTRIC LAYERS SEPARATED BY A CENTRAL CORE OF SEMIRIGID MATERIAL

FIELD AND BACKGROUND OF THE INVENTION

The present invention relates to a bimorph mirror. A bimorph mirror is conventionally made by superposing two piezoelectric ceramics, and at least one control electrode is placed at the interface between the two ceramics to vary the curvature of the mirror as a function of an electrical voltage applied to the piezoelectric ceramic. As a result, the thinner the mirror, the greater the variation in its radius of curvature.

In addition, ceramic fabrication suffers from limitations concerning the maximum width that can be obtained, with the consequence that it is necessary to build up assemblies with ceramic segments, thereby influencing the stiffness and/or the stability of the bimorph mirror. In particular, stiffness and stability are parameters that are important for the mirror polishing that necessarily takes place after the bimorph mirror has been assembled.

An object of the invention is to provide a bimorph mirror presenting stiffness that is greater than that of a prior art mirror.

Another object of the invention is to provide a bimorph mirror presenting stability that is greater than that of a prior art mirror.

Yet another object of the invention is to provide a bimorph mirror that is capable of being made with large dimensions, for example of meter order.

SUMMARY OF THE INVENTION

At least one of the above-specified objects is achieved by a bimorph mirror presenting first and second layers of piezoelectric ceramic together with at least one electrode serving to vary at least one curvature of the mirror as a function of at least one electrical voltage applied to the piezoelectric ceramics, the mirror being characterized in that the first and second layers of piezoelectric ceramic are separated by a central core of material such as glass or silica, which forms a semirigid beam.

The thickness e of the central core lies, for example, in the range 1 millimeters (mm) to 80 mm, and it may be greater than 2 mm or even 3 mm, or indeed greater than 5 mm. The total thickness E of the bimorph mirror may for example lie in the range 10 mm to 150 mm.

The bimorph mirror may be characterized in that the first and second layers of piezoelectric ceramic are formed by a plurality of ceramic elements placed side by side in at least one direction along section planes, and in that the section planes of said second layer are offset in at least one direction relative to the section planes of said first layer.

It may then be characterized in that said offset between the piezoelectric elements in at least one direction is equal to half a pitch P at which the piezoelectric elements are disposed in said direction.

BRIEF DESCRIPTION OF THE DRAWINGS

The invention can be better understood with the help of the following description given by way of non-limiting example and with reference to the drawings, in which:

FIGS. 3a to 3d show a bimorph mirror constituting a preferred embodiment of the invention, FIG. 3a being a side view, FIG. 3b being an enlarged view of a detail of FIG. 3a, and FIG. 3c being a view seen looking along B, while
FIG. 3d shows the control electrodes.

DETAILED DESCRIPTION

Figure 1:
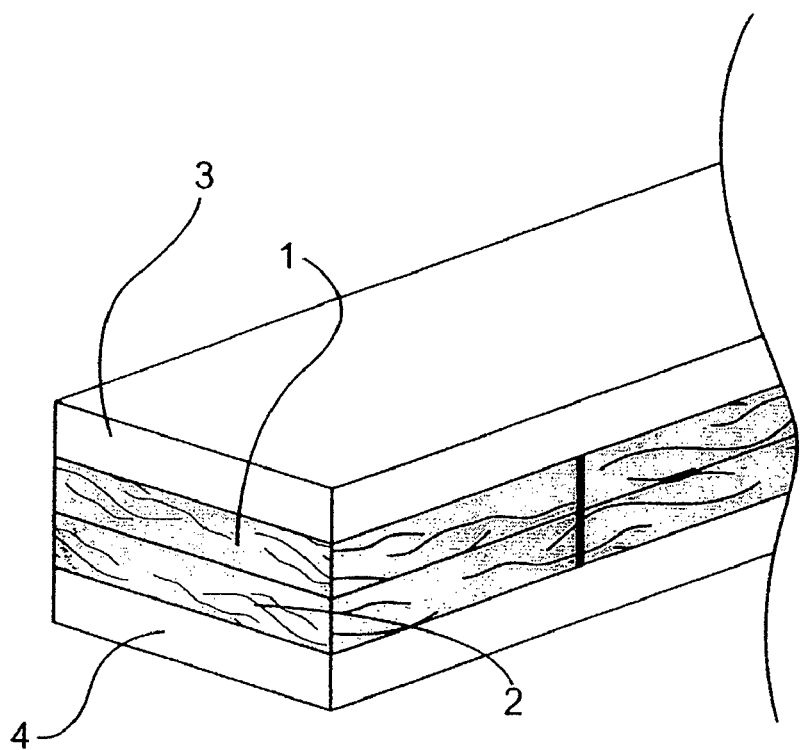
FIG. 1 shows a bimorph mirror of the prior art.
Figure 2:
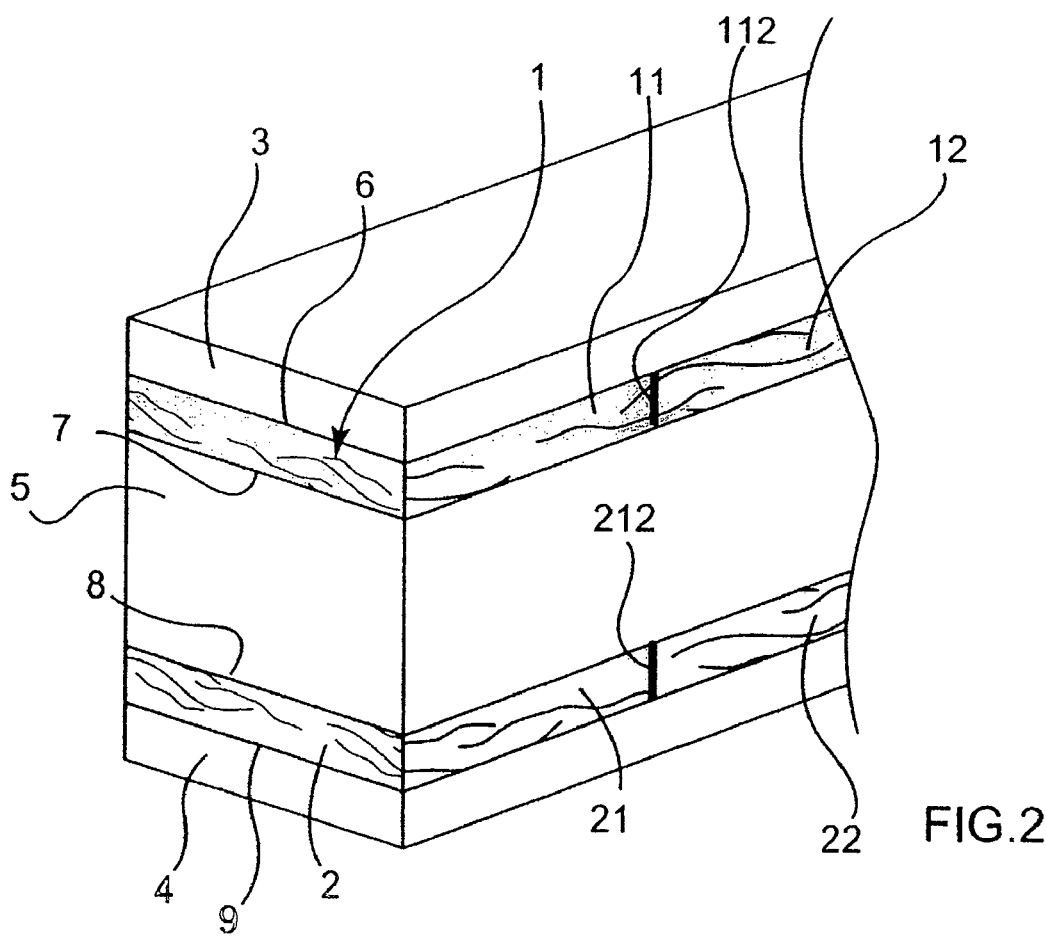
FIG. 2 shows a bimorph mirror of the present invention.

In FIG. 1, a prior art bimorph mirror comprises two stacked piezoelectric layers 1 and 2 sandwiched between two so-called "skin" layers 3 and 4 of glass or silicon, at least one of which is for use as a mirror. These mirrors, which are used in particular in adaptive optics, present curvature that varies as a function of an electric voltage applied to the piezoelectric ceramics.

Nevertheless, the thickness of bimorph mirrors is limited to a value of about 25 mm by the thickness of piezoelectric ceramics (for which fabrication defines a maximum thickness), and by the thickness of the skin layers 3 and 4, since as this thickness increases, the dynamic curvature of the mirror decreases.

In the invention, a central layer or core 5 of a material such as silica or glass is interposed between the layers 1 and 2.

This core 5 presents several advantages:
  it enables the effectiveness of each ceramic to be increased by moving it further away from a neutral fiber of the mirror, which neutral fiber is situated substantially in the midplane of the core 5;
  it enables thickness to be added, thereby increasing the inertia of the mirror and thus its stiffness and its stability; and
  because it is continuous over the length of the mirror, it presents a highly favorable effect on stability since it acts as a semirigid beam. This makes it possible to produce mirrors of great length, e.g. 1 meter long, without loss of stability or loss of curvature range.

The thickness e of the central core 5 can be defined as a function of the looked-for curvature characteristics. Increasing this thickness increases the stiffness of the mirror, but also increases the effectiveness of the piezoelectric actuators, because they are moved progressively further from the neutral fiber. Each thickness thus has a corresponding characteristic for curvature as a function of applied voltage. The appropriate thickness can thus be determined experimentally or with the help of calculation based on deformation by finite elements. In practice, it is advantageous to use a thickness e lying in the range 1 mm to 80 mm. The thickness E of the bimorph mirror may lie for example in the range 10 mm to 150 mm, and in particular it may be greater than 25 mm.

The figures show piezoelectric layers that are made up of a plurality of ceramic elements 11, 12 and 21, 22, . . . placed side by side at a pitch or in an array having two pitches along curvature planes (112, 123, 134, . . . , 178, 212, 223, 234, . . . , 267) that are perpendicular to the main faces 6, 7, 8, 9 of said layers 1 and 2.

Advantageously (see FIGS. 3a and 3c), the invention provides for the section planes (212, 223, 234, . . . , 267) of the layer 2 to be offset parallel to said main faces relative to the section planes (112, 123, 134, . . . , 178) of the layer 1, e.g. by being offset by one half-pitch in at least one direction parallel to said main faces. This enables the structure to be made more rigid, even if it does not have a core 5.

FIGS. 3a to 3d show the disposition of the electrodes for controlling the ceramic layers 1 and 2. Firstly, between the layers 1 and 3 there is a common electrode 45 that is continuous over the entire length of the mirror and that is associated with a side contact point $45_1$ (FIG. 3d), and between the layers 2 and 4 a common electrode 65 that is continuous over the entire length of the mirror, with a side contact point $65_1$ (FIG. 3d). Then, between the layer 1 and the core 5 there is a plurality of control electrodes given overall reference 30. In this example there are 14 control electrodes 31 to 44, and as many contact areas on a side edge of the device for controlling the layer 1. Finally, between the layer 3 and the core 5 there exists a plurality of control electrodes given overall reference 30. In this example, there are 14 control electrodes 51 to 64 disposed facing the electrodes 31 to 44 in order to control the layer 3, and as many contact areas on a side edge of the device.

The piezoelectric elements of the layers 1 and 2 are mounted in conventional manner with opposite polarities, so applying the same voltage to the facing control electrodes (31, 51; 32, 52; etc. . . . ) produces a compression displacement for one of the layers and a traction displacement for the other, thereby causing the mirror to be curved since the layers 1 and 2 are disposed on opposite sides of the neutral fiber.

The invention claimed is:

1. A bimorph mirror presenting first and second layers of piezoelectric ceramic having opposed polarities, together with at least one electrode serving to vary at least one curvature of the mirror as a function of at least one electrical voltage applied to the piezoelectric ceramics, the mirror being characterized in that the first and second layers of piezoelectric ceramic are separated by a central core of material which forms a semirigid beam, the thickness of the central core lying in the range 1 mm to 80 mm.

2. A bimorph mirror according to claim 1, wherein the thickness of the central core lies in the range 2 mm to 80 mm.

3. A bimorph mirror according to claim 2, wherein the thickness of the central core lies in the range 5 mm to 80 mm.

4. A bimorph mirror according to claim 1, wherein said central core is constituted by a material selected from glass and silica.

5. A bimorph mirror according to claim 1, wherein the first and second layers of piezoelectric ceramic are sandwiched between two skin layers of glass or of silicon.

6. A bimorph mirror according to claim 1, wherein it presents a total thickness lying in the range 10 mm to 150 mm.

7. A bimorph mirror according to claim 1, wherein the first and second layers of piezoelectric ceramic are formed by a plurality of ceramic elements placed side by side in at least one direction along section planes, and the section planes of said second layer are offset in at least one direction relative to the section planes of said first layer.

8. A bimorph mirror according to claim 7, wherein said offset between the piezoelectric elements in at least one direction is equal to half a pitch P at which the piezoelectric elements are disposed in said direction.

9. A bimorph mirror presenting first and second layers of piezoelement ceramic having opposed polarities, together with at least one electrode enabling at least one curvature of the mirror to be caused to vary as a function of at least one electrical voltage applied to the piezoelectric ceramics, the mirror being characterized in that the first and second layers of piezoelectric ceramic are made up of respective pluralities of ceramic elements placed side by side in at least one direction along section planes, and in that the section planes of said second layer are offset in at least one direction relative to the section plane of said first layer.

10. A bimorph mirror according to claim 9, wherein said offset between the piezoelectric elements in at least one direction is equal to half a pitch P at which the piezoelectric elements are placed in said direction.

* * * * *